United States Patent [19]

Horn et al.

[11] Patent Number: 5,656,766
[45] Date of Patent: Aug. 12, 1997

[54] UNDERGROUND DRAIN TANK

[75] Inventors: Donald G. Horn; David K. Wiebe, both of Calgary, Canada

[73] Assignee: Lafarge Canada Inc., Montreal, Canada

[21] Appl. No.: 546,577

[22] Filed: Sep. 22, 1995

[30] Foreign Application Priority Data

Sep. 23, 1994 [CA] Canada ............... 2132799

[51] Int. Cl.$^6$ .................. G01M 3/32; B65B 31/04
[52] U.S. Cl. ........................ 73/49.2; 73/40.5 R
[58] Field of Search ................... 73/49.2, 40.5, 73/40

[56] References Cited

U.S. PATENT DOCUMENTS

| | | | |
|---|---|---|---|
| 4,936,705 | 6/1990 | Schneider | 405/54 |
| 4,989,447 | 2/1991 | Gelin | 73/49.2 |
| 5,054,312 | 10/1991 | Wilson, II | 73/49.2 |
| 5,072,609 | 12/1991 | Sharp | 73/49.2 |
| 5,072,623 | 12/1991 | Hendershot | 73/49.2 |
| 5,117,677 | 6/1992 | Hendershot et al. | 73/49.2 |
| 5,167,142 | 12/1992 | Sharp | 73/49.2 |
| 5,184,504 | 2/1993 | Spring | 73/49.2 |
| 5,191,785 | 3/1993 | Kidd et al. | 73/49.2 |
| 5,269,172 | 12/1993 | Daigle et al. | 73/40.7 |
| 5,400,646 | 3/1995 | Kraus et al. | 73/49.2 |

Primary Examiner—Hezron E. Williams
Assistant Examiner—J. David Wiggins
Attorney, Agent, or Firm—Christensen O'Connor Johnson & Kindness

[57] ABSTRACT

A drain tank for installation underground has a longer life than steel and fibreglass tanks and has a leak detection system to identify leaks. The drain tank comprises a sealed concrete chamber having at least one opening at the top thereof with a collar integral therewith, a manway connected to the collar extending upwards, the manway having a top lid with a vent and pump out exit. Inside the concrete chamber is an impervious bag liner which is sealed to the collar; an entry pipe passes through the chamber side wall and the liner and a leak detector tube passes down into the chamber to a location at the base between the chamber and the liner having an intermediate gap spacing arranged therein for an insertion tube to pass therethrough thereby facilitating the task of leak detection when interconnecting such insertion tube with a vacuum means and a suction reservoir.

10 Claims, 4 Drawing Sheets

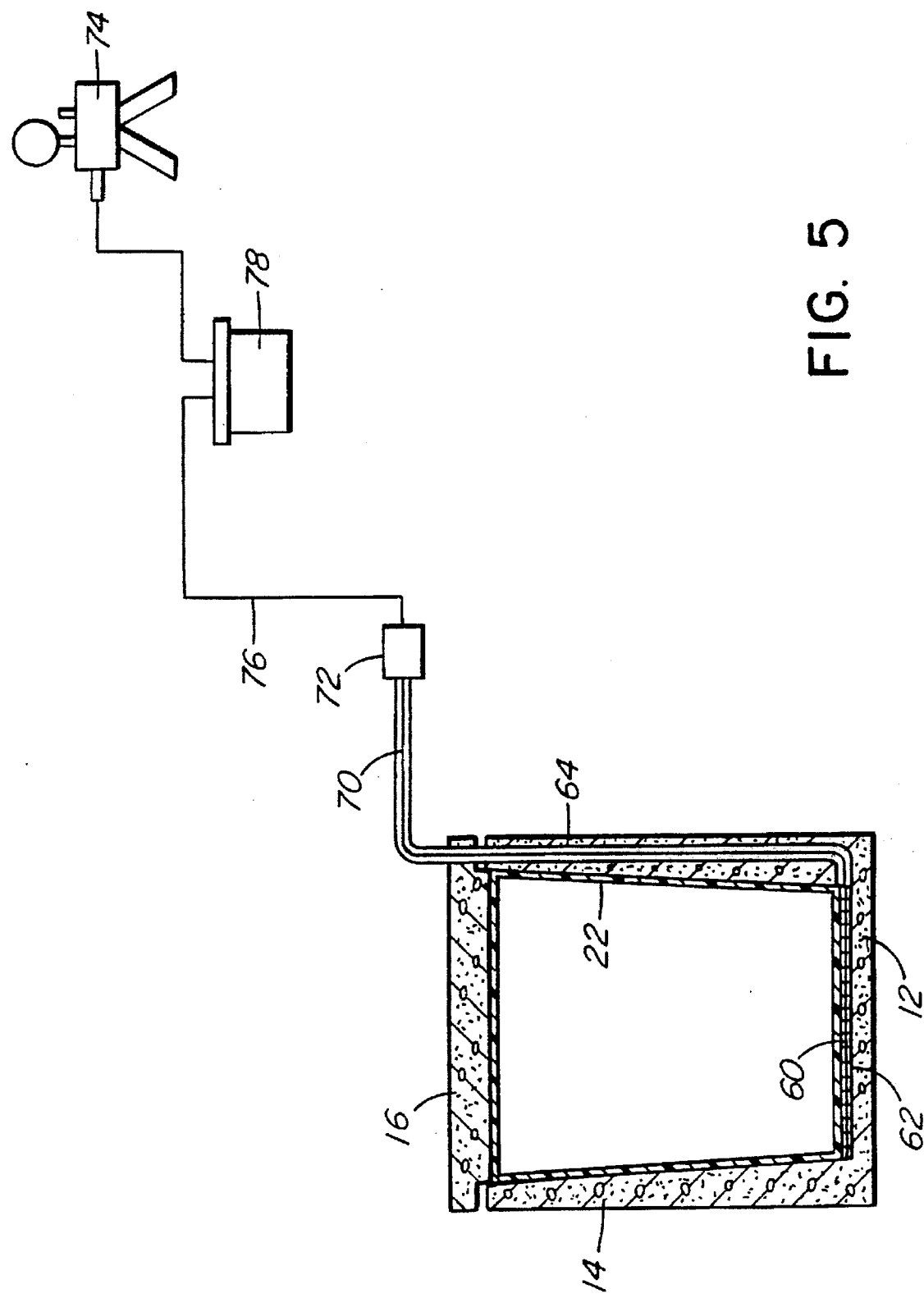

UNDERGROUND DRAIN TANK

TECHNICAL FIELD

The present invention relates to a drain tank for installation underground and more specifically for a drain tank having a leak detection system.

BACKGROUND ART

Underground drain tanks are required at compressor stations for gas wells, gas pipelines, i.e. compressor stations and the like, to collect contaminants during wash-down. Presently, the tanks used are typically fibreglass and steel, however, it has been found that the tanks themselves often rust or collapse resulting in leakage into the soil. This presents an environmental problem, particularly because some of these tanks contain amino acids, hydrocarbons and hydrogen sulphides.

Thus, there is a need for a containment vessel for underground use that is long lasting, strong and does not corrode or rust. There is also a need for an underground tank which may be tested from time to time to ensure that leakage is not occurring into the ground and thus contamination of the soil does not occur.

At present there are both steel and fibreglass tanks available as containment vessels.. These tanks are built with double walls and some have leak detection monitoring systems. However, if a double walled tank develops a leak, the whole tank must be replaced.

DISCLOSURE OF INVENTION

It is an aim of the present invention to provide a drain tank which is a solid concrete structure having an impervious liner therein, which may be rigid of flexible, together with a sensing device to sense if any leak occurs from the liner into the body of the concrete tank. If a leak occurs in the liner, then the liner can be replaced without having to destroy the tank.

The liner acts as the primary containment, and the concrete structure as the secondary containment. The liner can be removed or replaced from the concrete structure.

The present invention provides a drain tank for underground use comprising a sealed concrete chamber having at least one opening at a top thereof with a collar integral therewith; a manway connected to the collar extending upwards, the manway having a top lid with, vent and pump out exit; an impervious liner within the concrete chamber attached and sealed to the collar; an entry pipe passing, through the chamber and the, liner, and a leak detector tube passing down into the chamber to a location at the base between the chamber and the liner for an insertion tube to pass therethrough.

BRIEF DESCRIPTION OF DRAWINGS

In drawings which illustrate embodiments of the present invention,

FIG. 5 is a schematic view showing the leak detector system.

BEST MODE FOR CARRYING OUT THE INVENTION

Figure 1:
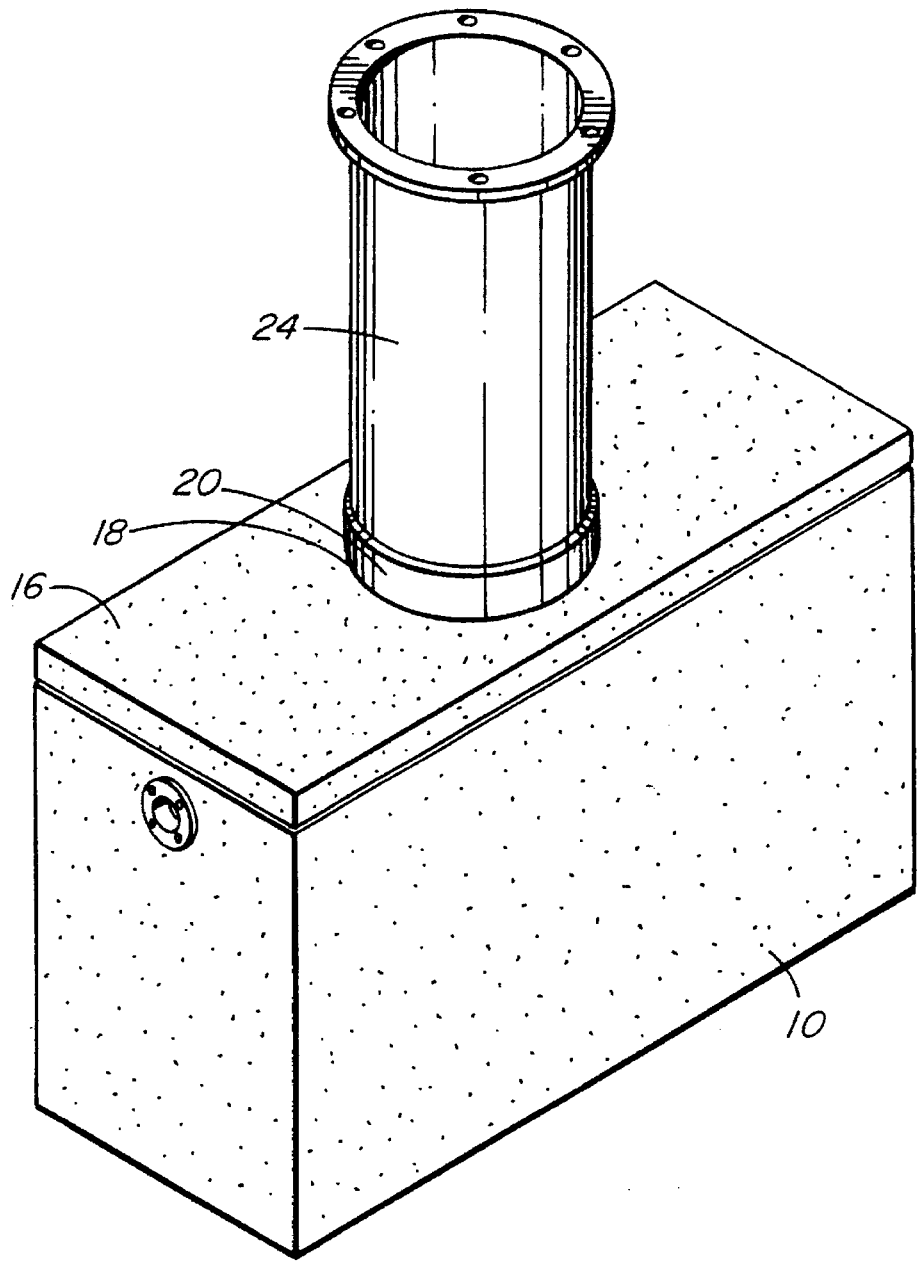
FIG. 1 is an isometric view showing a drain tank for underground use according to one embodiment of the present invention.
Figure 2:
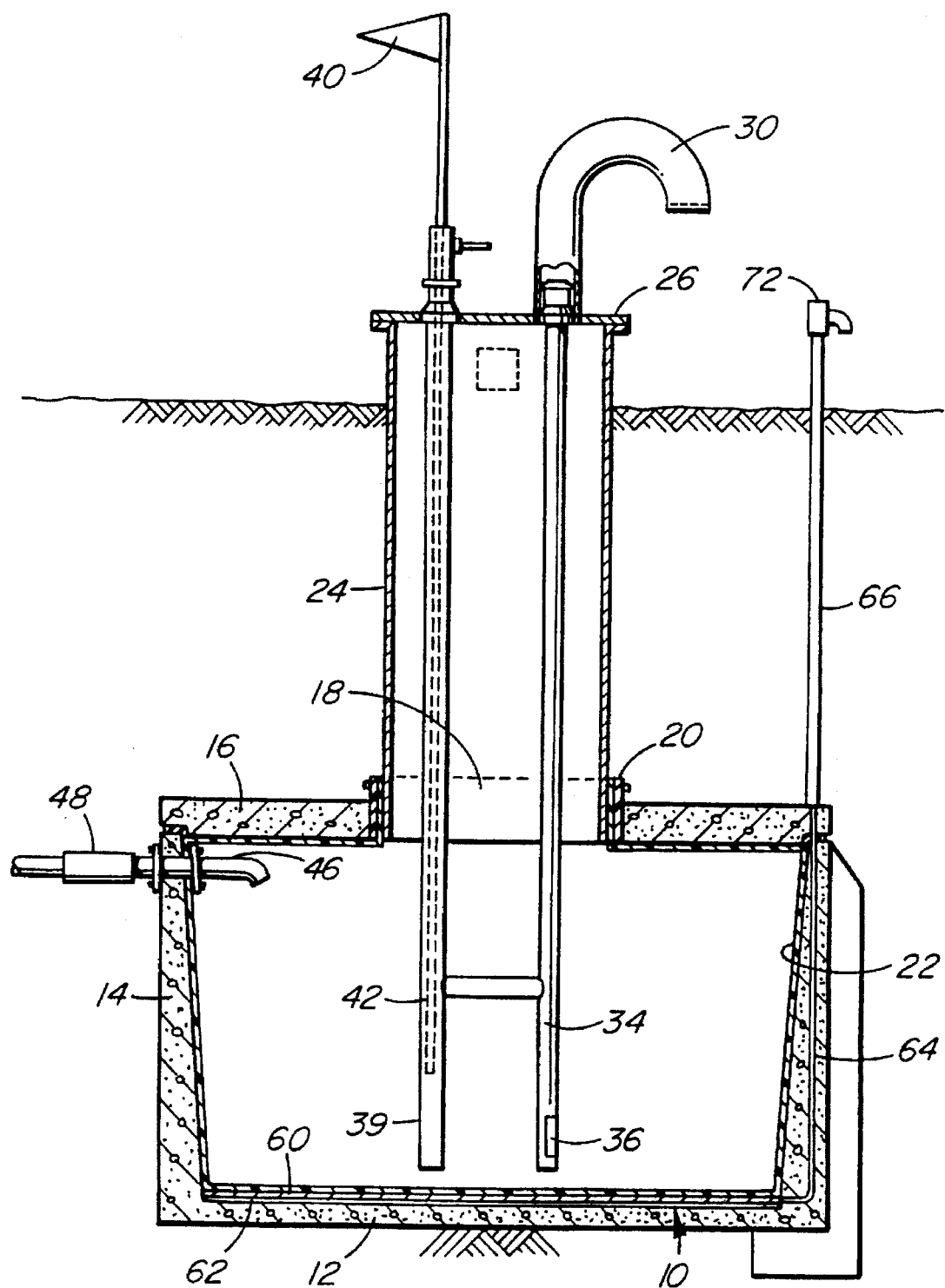
FIG. 2 is a sectional view of the drain tank shown in FIG. 1.

As shown in FIGS. 1 and 2, the basic tank 10 is formed of precast concrete, rectangular in shape, with a substantially flat inner base 12 and four walls 14. The precast concrete has reinforced bars installed therein for strength and is precast so that is can be formed before being installed. In one embodiment a chemical sealer is applied to the surface of the concrete to provide a moisture barrier and increase the life of the tank. One such densifier is sold under the trade mark PROTOCRETE by Advanced Concrete Technology Inc.

A precast concrete top cover 16 is formed separately from the chamber 10 and has an opening 18 into which is fitted a fibreglass collar 20. The collar 20 is molded into the concrete cover 16 and thus becomes integral with the cover. The cover 16 is placed over the chamber and sealed to the chamber by a sealing composition suitable for installation underground and to ensure that failure of the seal does not occur for the life of the tank.

In one embodiment an impervious flexible bag liner 22, preferably made of a urethane composition, such as a urethane composition is referred to under the trade style XR5 supplied by Siemans Corporation fits within the chamber 10. The liner 22 has sufficient strength to retain liquid therein and is designed to exactly fit within the tank 10. In another embodiment an impervious rigid liner 22 fits within the chamber 10. Both types of liners are suitable provided they are impervious and complete leak proof. An opening is provided in the top of the liner 22 and the liner has a neck which extends up through the collar 20 and is attached to the top of the collar 20 by means of gaskets and bolts that provide a seal between the liner 22 and the collar 20 and thus between the tank 10 and the liner 22.

Figure 3:
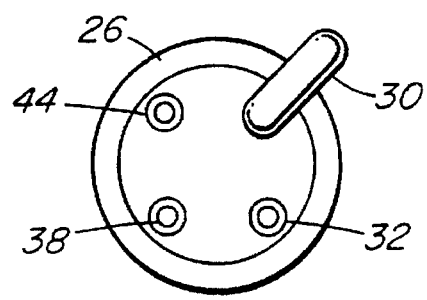
FIG. 3 is a detailed plan view showing the top cover for the manway with three nozzles and one vent therein.

A manway 24 or stack is attached to the top of the collar 20 and extends up to a height that is above ground level. The manway 24 is of sufficient diameter for a person to enter the tank if maintenance is required. On top of the manway 24 is a top cover 26 as shown in FIG. 3 which has three nozzle entries and a vent 30 with an insect screen over one end to vent the tank. The size of the vent 30 depends upon the interior pressures caused by the rate of incoming liquid into the tank 10. The tank is maintained as close to atmospheric pressure as possible and then the vent is sized for the application of the tank 10. A pump out nozzle 32, or first nozzle 32, is provided with an internal stringer pipe 34 extending down to the bottom of the tank 10 having a side hole 36 equal to or larger than the pipe diameter, so that the tank may be pumped out. The side hole 36 prevents the liner 22 being sucked against the bottom of the pipe 34. A second nozzle 38 has a float with a flag 40 at the top thereof. There is another stringer pipe 39 attached to the second nozzle 38 which has a series of side holes therein for the length of the pipe. A float 42 moves up and down within the stringer pipe 39 and flag 40 connected to the float 42 provides an indication of the level of liquid in the tank. Some tanks are installed in remote areas where no electrical power is available, so the flag provides an easy indication for operating personnel to have the tank emptied.

A third nozzle 44 is provided as an option for a high level sensing device when power is available, if the liquid level reaches a predetermined height, then a sensing device activates an alarm. Alternatively, the high level sensing device indicates liquid levels in the tank.

Figure 4:
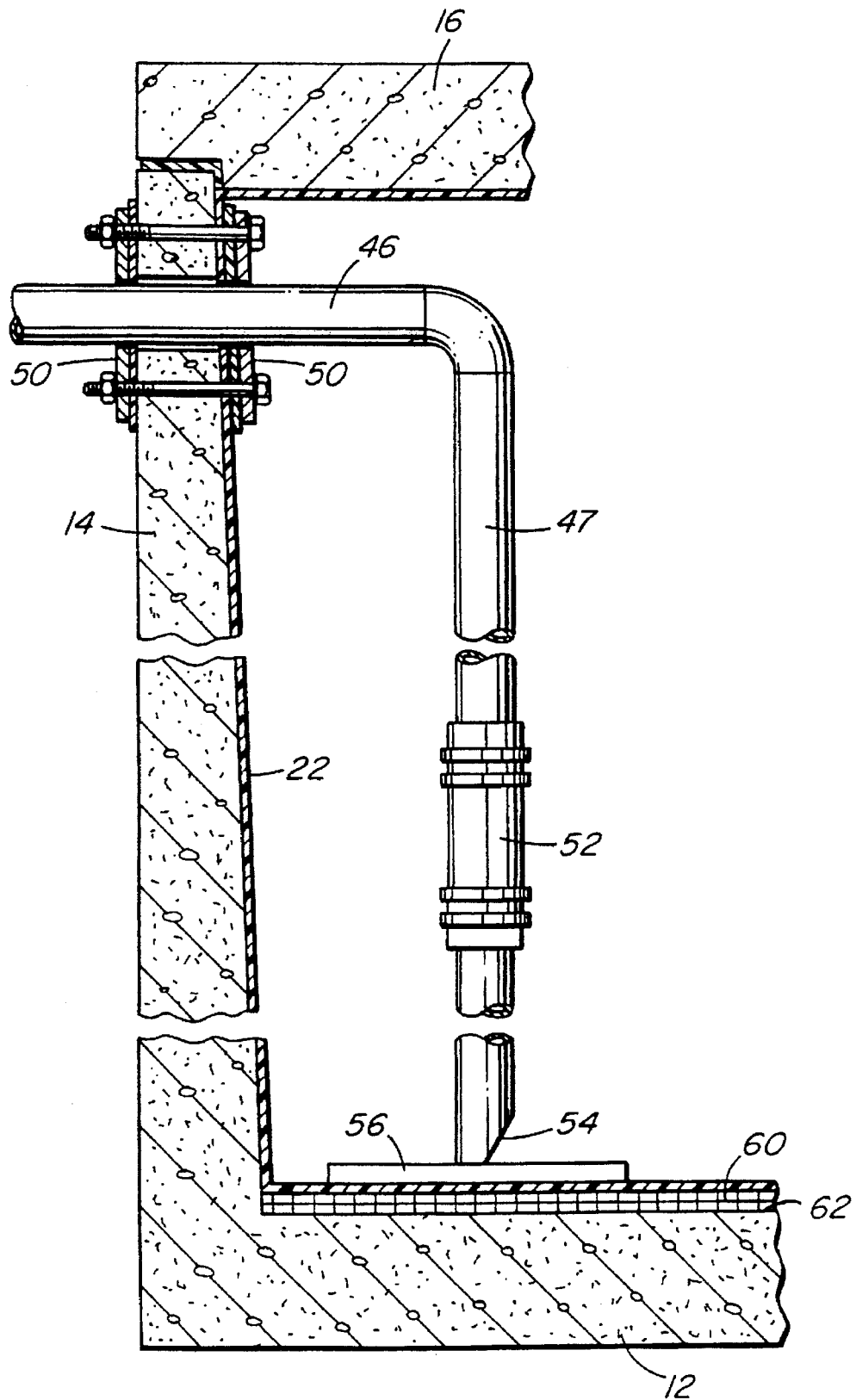
FIG. 4 is a partial sectional view through the drain tank showing the entry pipe construction.

Details of two alternative types of entry pipes 46 are shown in FIGS. 2 and 4. As shown in FIG. 2, flexible pipe connection 48 is provided outside the tank, the pipe 46 passes through the concrete wall 14 and the liner 22 and is joined together with flanges 50 with gaskets and seals therein. The entry pipe 46 has a 45° elbow therein to divert liquid downwards. FIG. 4 shows a second alternative wherein a 90° elbow on the entry pipe 46 joins to a vertical pipeline portion 47 extending down via another flexible connection 52 to an exit 54. The bottom of the pipe is angled and attached to a pad 56 which rests on the lining 22, on the base 12 of the tank 10. Thus, liquid entering through the entry pipe passes down and exits at the base. The pad 56 deflects the liquid upwards so that it does not impinge directly onto the liner 22.

Between the concrete base 12 and the liner 22 a grid 60 is provided as shown in FIG. 4, thus leaving a space 62. A leak detector conduit 64 extends vertically down through one of the walls 14 of the concrete chamber 10 from the top thereof and exits into the space 62 where the grid 60 is positioned. The conduit 64 passes through the cover 16 and has a pipe 66 which extends up to the surface. As shown in FIG. 5, a flexible leak sensing tube 70 or insertion tube may be passed down through the pipe 66 and the leak detector conduit 64 so that it enters the space 62 between the liner 22 and the concrete base 12. A sealing plug 72 is provided on top of the pipe 66 and a manual vacuum pump 74, preferably of a type sold under the trade mark MITYVAC, is connected by a tube 76 through a suction reservoir 78. The pump 74 provides a vacuum to the leak detector tube 70 and thus sucks up liquid in the space 62 between the liner 22 and the concrete base 12 and deposits the liquid into the suction reservoir 78. For testing purposes, the liner is vacuum pressurized from the inside of the tank and the leak detector tube is left open. The unit is allowed to sit for six hours. If the pressure does not drop below allowable tolerances then a further stage of testing is carried out. In the next stage, air is injected into the leak detector tube. Leaks are looked for on the outside of the tank 10 by soaping the outside surface of the tank. If any air bubbles are visible, the leaks are repaired and the tank retested until no leaks occur.

With regard to testing for leaks, an operator inserts the leak sensing tube 70 right down into the space 62 between the liner 22 and the concrete base 10, operates the vacuum pump 74 so that a small vacuum occurs, the vacuum either causes a liquid sample within the space 62 to reach the suction reservoir 78, alternatively the vacuum pressure increases to roughly 25 inches of mercury indicating that there is a sample in the space 62 but that it is too viscous for the pump to extract it or, alternatively, no sample is sucked up through the tube 70 and the pressure does not substantially change, therefore there is no liquid sample in the space 62 meaning that the liner is free from leaks.

By obtaining the sample in the suction reservoir, one is able to determine whether the leak is for example, surface water coming from outside the concrete tank 10 which would be indicative of the tank leaking or whether it is an oil component or the like which would indicate that the liner is leaking.

A flexible liner may be replaced by a person entering the tank and disconnecting the liner around the top, particularly at the entry pipe which must be removed, then disconnecting the beck of the liner from the collar 20 and removing the liner through the manway 18. A new flexible liner can then be inserted and tested for leaks after it has been properly installed. In the case of a rigid liner, the tank cover is is removed, the old liner removed and a new liner inserted. The tank cover is is then replaced and resealed after testing for leaks.

For installation of the tank it is necessary to excavate a hole of sufficient size and ensure that there are no rocks therein. The tank is then positioned and one embodiment tank lift anchors are provided for lifting a tank into position. The manway 24 is mounted after the tank has been installed and the cover plate 26 is then positioned over the manway 24 with the pump out stringer. 34 installed as well as the float arrangement.

In one embodiment the capacity of a tank is 2,500 Imperial gallons (72 barrels) and the manway diameter is approximately 3 feet wide, thus providing ample space for a person to enter the tank for inspection purposes.

Various changes may be made to the embodiments shown herein without departing from the scope of the present invention which is limited only by the following claims.

The embodiments of the present invention in which an exclusive property or privilege is claimed are defined as follows:

1. A drain tank for underground use in containing liquid spills or leaks comprising:

a sealed concrete chamber with a concrete base, concrete side walls and an open top;

a concrete lid over the open top of the chamber and sealed to the top of said side walls, the concrete lid having at least one opening therein with a collar integral therewith;

a manway connected to the collar of said concrete lid extending upwards, the manway having a top cover with vent and pump out exit;

an impervious liner within the concrete chamber attached and sealed to the collar;

a grid positioned at the base of the chamber between the chamber and the liner providing an intermediate gap spacing therein;

an entry pipe passing through one of the side walls of the chamber and the liner, and a leak detector tube passing down into the intermediate gap spacing at the base of the chamber for an insertion tube to pass therethrough and withdraw a fluid sample from the said intermediate gap spacing under the influence of an applied suction as a means for detecting leaks in said drain tank.

2. The drain tank according to claim 1 wherein the sealed concrete chamber is substantially rectangular and wherein said concrete lid is substantially rectangular.

3. The drain tank according to claim 2 wherein the entry pipe passes through one of the side walls of the concrete chamber, and has a flexible coupling exterior of the tank, the entry pipe has a 45° elbow within the tank to direct liquid downwards into said impervious liner.

4. The drain tank according to claim 2 wherein the collar is formed of fibreglass and wherein the liner has a neck integral therewith which is sealed to the top of the collar by means of gaskets and tightened nuts.

5. The drain tank according to claim 2 wherein the entry pipe passes through one of the side walls of the concrete chamber and has a flexible coupling exterior of the tank, the entry pipe has a 90° elbow within the tank extending down to an outlet attached to a plate resting on the liner at the base of the concrete chamber.

6. The drain tank according to claim 1 wherein the leak detector tube passes through one of the side walls of the chamber and exits into the intermediate gap spacing at the base of the chamber.

7. The drain tank according to claim 4 wherein the gaskets are formed of neoprene.

8. The drain tank according to claim 1 wherein the liner is formed of flexible leak-proof material.

9. The drain tank according to claim 1 wherein the liner is formed of rigid leak-proof material.

10. The drain tank according to claim 6 wherein the leak detector tube exits one of the side walls of the chamber and joins to a rigid pipe extending up from the drain tank to a position above ground level and has a plumbing connection made at the top of the pipe to attach said rigid pipe to a vacuum means.

* * * * *